(12) United States Patent
Tsukiyama et al.

(10) Patent No.: US 9,134,431 B2
(45) Date of Patent: Sep. 15, 2015

(54) RADIATION DETECTOR

(75) Inventors: Akira Tsukiyama, Hino (JP); Takuto Sakumura, Hachioji (JP); Yuji Tsuji, Hamura (JP); Pawel Grybos, Rzaska (PL); Piotr Maj, Bilgoraj (PL); Robert Szczygiel, Krakow (PL)

(73) Assignee: RIGAKU CORPORATION, Tokyo (JP)

( * ) Notice: Subject to any disclaimer, the term of this patent is extended or adjusted under 35 U.S.C. 154(b) by 226 days.

(21) Appl. No.: 13/813,658

(22) PCT Filed: Dec. 9, 2010
(Under 37 CFR 1.47)

(86) PCT No.: PCT/JP2010/072151
§ 371 (c)(1),
(2), (4) Date: Apr. 5, 2013

(87) PCT Pub. No.: WO2012/077217
PCT Pub. Date: Jun. 14, 2012

(65) Prior Publication Data
US 2014/0131588 A1 May 15, 2014

(51) Int. Cl.
*G01T 1/24* (2006.01)
*G01T 1/16* (2006.01)
*H04N 5/32* (2006.01)
*H04N 5/378* (2011.01)
*H04N 5/335* (2011.01)
*H04N 5/374* (2011.01)

(52) U.S. Cl.
CPC . *G01T 1/16* (2013.01); *G01T 1/247* (2013.01); *H04N 5/32* (2013.01); *H04N 5/335* (2013.01); *H04N 5/374* (2013.01); *H04N 5/378* (2013.01)

(58) Field of Classification Search
CPC ...................................................... G01T 1/247
See application file for complete search history.

(56) References Cited

U.S. PATENT DOCUMENTS

| | | | |
|---|---|---|---|
| 6,248,990 B1 | 6/2001 | Pyyhtiä et al. | |
| 6,355,923 B2 | 3/2002 | Pyyhtiä et al. | |
| 6,847,040 B2 | 1/2005 | Strömmer | |
| 7,456,409 B2 * | 11/2008 | Dhurjaty et al. | 250/370.09 |
| 7,514,688 B2 | 4/2009 | Broennimann et al. | |
| 7,586,168 B2 | 9/2009 | Raynor | |
| 8,039,784 B2 | 10/2011 | Schmitt | |
| 2001/0025914 A1 | 10/2001 | Pyyhtia et al. | |
| 2002/0092970 A1 | 7/2002 | Pyyhtia et al. | |
| 2003/0035510 A1 | 2/2003 | Strommer | |
| 2009/0285352 A1 | 11/2009 | Schmitt | |

(Continued)

FOREIGN PATENT DOCUMENTS

| | | |
|---|---|---|
| JP | 10-271365 A | 10/1998 |
| JP | 2001-502424 A | 2/2001 |

(Continued)

*Primary Examiner* — Constantine Hannaher
(74) *Attorney, Agent, or Firm* — Birch, Stewart, Kolasch & Birch, LLP

(57) ABSTRACT

A radiation detector 100 has a plurality of single-photon-counting imaging cells, including an imaging cell 1 configured to generate a detection signal in accordance with the intensity of radiation, a digitization circuit 5 configured to digitize the detection signal, a data read structure 11 configured to count the digitized detection signal and to keep the result as a data bit, and a send-out register 13 configured to control the input of a predetermined data bit output from the data read structure 11 by a data shift in accordance with a first clock Pck, to keep the input data bit as a result of the control, and to send out the kept data bit by a data shift in accordance with a second clock Sck.

11 Claims, 24 Drawing Sheets

(56) References Cited

FOREIGN PATENT DOCUMENTS

| | | |
|---|---|---|
| JP | 2002-530016 A | 9/2002 |
| JP | 2003-527610 A | 9/2003 |
| JP | 2006-033496 A | 2/2006 |
| JP | 2008-172609 A | 7/2008 |
| JP | 2009-519585 A | 5/2009 |
| WO | 00/28729 A1 | 5/2000 |

* cited by examiner

| BIT POSITION IN SHIFT REGISTER | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| BIT POSITION WHEN MOVED TO TRANSFER SHIFT REGISTER | 0 | 8 | 4 | 12 | 2 | 10 | 6 | 14 | 1 | 9 | 5 | 13 | 3 | 11 | 7 | 15 |

FIG. 18

RADIATION DETECTOR

TECHNICAL FIELD

The present invention relates to a radiation detector (imaging device) having a plurality of single-photon-counting imaging cells.

BACKGROUND ART

An imaging detector of radiation includes a number of pixels and converts the intensity or energy of incident radiation into a count value inside thereof. Then, the result of count can be extracted to outside by various kinds of measures.

In the example shown in FIG. 2 of Patent Document 1, charges in proportion to the amount of energy output from the photodiode by incident X-rays are input to the charge amplifier circuit. Then, only incident signals corresponding to energy higher than a certain reference voltage are turned to pulses, which are input to a counter and counted. The count is read by the 10-bit data path. When performing read, it is necessary to send a signal one by one into the read circuit from outside and to send out data of the counter to the path.

The problem of this system lies in that a read signal corresponding to each of all the read circuits is necessary. Because of this, it is necessary to provide a number of internal signal lines or to adopt a system in which a numerical value is specified as an address and the numerical value is decoded. With the former, the circuit becomes complicated and with the latter, a demerit that time necessary for read is increased arises.

In the example of FIG. 4 of Patent Document 1, the counter is connected to the neighboring read circuits on both sides continuously with 1-bit data width in between and data is sent out sequentially at the time of read. Due to this, compared to the example of FIG. 2, the circuit configuration is simplified remarkably. In this case, but, it is necessary to read the data of all bits that all the read circuits have, and therefore, it takes time to read data according to the configuration of the imaging device. Due to this, the frame rate is restricted by the read time.

In the example of FIG. 2, by limiting the number of read circuits to be read, it is also possible to reduce the amount of data itself and to shorten the time necessary for read. In this case, however, data to be configured as an image is lost at a specific portion, and therefore, there is a possibility that information that should be possessed as image data is lost remarkably.

In Patent Document 2, a reading method adopting another system is shown (FIG. 5, FIG. 6). Here, data counted by the asynchronous n-bit counter is temporarily moved to the loadable shift register and the shift register is connected in series to the previous pixel and the next pixel continuously. With this configuration, it is possible for the counter to start the next counting operation immediately by temporarily moving the data to the shift register. However, unless all the data of the shift register is read, it is not possible to move data from the next counter to the shift register, and therefore, the frame rate is restricted by the time taken by read from the shift register.

In Patent Document 3, as another example, the method is shown (FIG. 6), in which data is read by specifying the position by the ROW specification and the COLUMN specification for the read cells arranged on the imaging device in the form of a matrix. In this case, the read time is determined by [number of times of read of all the read circuits]×[number of bits of each piece of data]. Further, similar to the example of FIG. 2 of Patent Document 1, if the number of read circuits to be read is limited, information that should be possessed as image data is lost.

Patent Document 1: U.S. Pat. No. 7,586,168
Patent Document 2: Japanese Patent Publication No. 2001-502424
Patent Document 3: U.S. Pat. No. 7,514,688

DISCLOSURE OF THE INVENTION

As described above, the prior art adopts the system in which data of specific read cells is read by some sort of addressing or data is shifted and sent out by forming a series of shift registers.

However, with the former, the read time is determined and if the number of read circuits to be read is limited, information of image data is impaired. Further, with the latter, until data of all the read cells is read, data acquisition is not completed and if the configuration is fixed once, the time to read data outside the device is fixed.

The present invention has been made in view of such circumstances and an object thereof is to provide a radiation detector that shortens the time necessary to read data to outside according to the necessity to increase a frame rate.

(1) In order to achieve the above-described object, a radiation detector according to the present invention is a radiation detector having a plurality of single-photon-counting imaging cells, including an imaging cell configured to generate a detection signal in accordance with the intensity of radiation, a digitization circuit configured to digitize the detection signal, a data read structure configured to count the digitized detection signal and to keep the result as a data bit, and a send-out register configured to control the input of a predetermined data bit output from the data read structure by a data shift in accordance with a first clock, to keep the input data bit as a result of the control, and to send out the kept data bit by a data shift in accordance with a second clock.

By limiting the output of a predetermined data bit as described above, it is possible to make the number of data bits actually kept in the counter unit sufficiently smaller than the total bit number of the counter unit. This is effective, for example, in a case where even if the read from the most significant bit is omitted, the contents of the data as image data are not impaired so much. For example, in the case where a configuration is adopted, in which the time intervals at which repeated read is performed and the numerical value kept within the counter unit are in a proportional relationship, by omitting the read of data bit until an optimum state is brought about, it is possible to shorten the read time and to shorten the time intervals at which repeated read is performed.

(2) Further, the radiation detector according to the present invention is characterized in that a plurality of counter units configuring the data read structure switches the connections of internal shift registers between data recording and readout by the control from outside. Due to this, it is possible to make the number of data bits sufficiently small without increasing the number of circuit parts.

(3) Further, the radiation detector according to the present invention is characterized in that the send-out register limits the output of the data bit on the lower digit side by the control of the input of the data bit. Due to this, it is possible to efficiently count only the portion where radiation is strong.

(4) Further, the radiation detector according to the present invention is characterized in that the send-out register limits the output of the data bit on the higher digit side by the control of the input of the data bit. Due to this, it is possible to efficiently count minute radiation.

(5) Further, the radiation detector according to the present invention is characterized in that the send-out register has a load switch unit configured to switch between enabling and disabling the output of a predetermined data bit output from the data read structure in accordance with a load signal received from outside. Due to this, it is possible to omit the readout of a predetermined data bit.

(6) Further, the radiation detector according to the present invention is characterized in that the imaging cell has a photodiode which is applied with a reverse bias voltage and generates a current signal in response to incidence of radiation and in that the digitization circuit has an amplifier configured to amplify an input signal based on the current signal generated by the photodiode and a wave height discriminator configured to discriminate output signals based on the amplified signal. Due to this, it is possible to make the number of data bits sufficiently small when counting the number of X-ray photons in accordance with energy. A digital signal in accordance with the level of radiation energy is obtained.

(7) Further, the radiation detector according to the present invention is characterized in that the send-out register has shift units in the same number as that of the data read structures and the output of the data read structure is connected to each shift unit. Due to this, it is possible to shorten the read time by simple control.

(8) Further, the radiation detector according to the present invention is characterized in that the send-out register produces an output from both an end and a middle of the series of shift units. Due to this, it is made possible to read data in a shorter time.

(9) Further, the radiation detector according to the present invention is characterized in that the plurality of counter units configuring the data read structure has a shift register configure to keep the data bit and a transfer shift register configured to reflect the data bit kept in the shift register by the control from outside. Due to this, it is possible for the shift register to perform the count or keep operation also during the read operation in the data read structure.

(10) Further, the radiation detector according to the present invention is characterized in that the shift register reflects data in the transfer shift register after rearranging the arrangement of each data bit in accordance with a pattern based on a table determined in advance. Due to this, it is possible to reduce the influence of the burden of current caused by an increase in the density of clocks of data load to the shift unit.

(11) Further, the radiation detector according to the present invention is characterized by further including a bypass to exclude a specific counter unit of the plurality of counter units the inputs and outputs of which are connected in series to each other from the data read structure and a bypass selection circuit configured to determine selection or unselection of the bypass. Due to this, it is possible to avoid such a problem that it becomes no longer possible to read the whole of a specific data read structure due to a malfunction of a certain counter unit on the way.

According to the present invention, it is possible to increase the frame rate. Due to this, applications to imaging at a high speed, to observation of a specimen that changes quickly, to the analysis method, etc., are enabled.

BRIEF DESCRIPTION OF THE DRAWINGS

FIG. 18 is an example of a table showing predetermined bit positions recorded in a shift register.

BEST MODES FOR CARRYING OUT THE INVENTION

Figure 1:
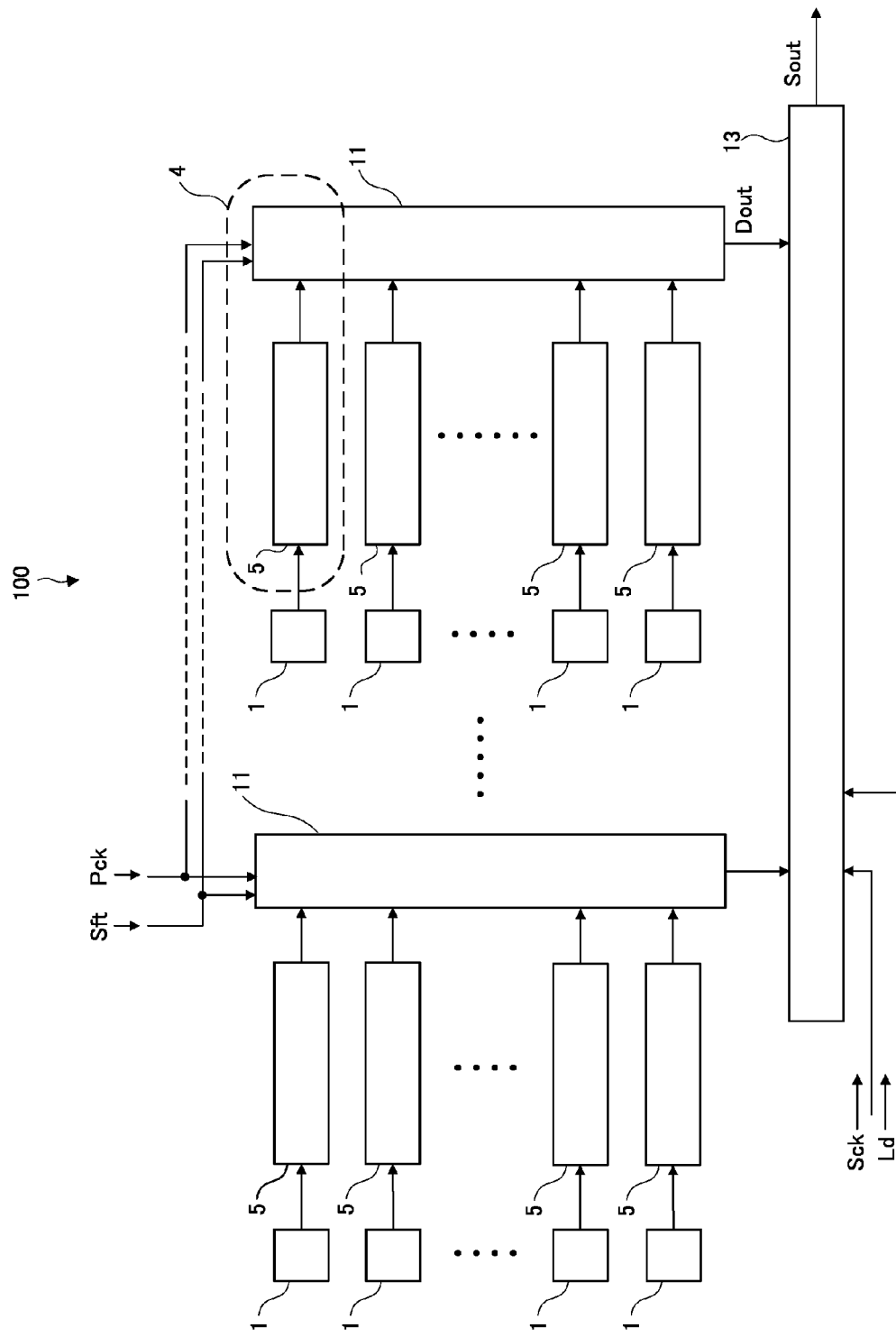
FIG. 1 is a block diagram showing a configuration of a radiation detector according to a first embodiment.

Next, embodiments of the present invention are explained with reference to the drawings. In order to facilitate understanding of the explanation, in each drawing, the same reference numeral is attached to the same component and duplicated explanation is omitted.

First Embodiment

General Configuration

FIG. 1 is a block diagram showing a configuration of a radiation detector 100. The radiation detector 100 has a plurality of single-photon-counting imaging cells 1. Radiation to be detected includes at least X-rays and y-rays. It is possible to apply the radiation detector 100 to imaging using X-rays and a detecting unit for an analysis method, such as the X-ray diffraction method. As shown in FIG. 1, the radiation detector 100 includes the imaging cell 1, a digitization circuit 5, a data read structure 11, and a send-out register 13.

The imaging cell 1 generates a detection signal in accordance with the intensity of radiation. The digitization circuit 5 digitizes the detection signal output from the imaging cell 1. The data read structure 11 counts the digital signal and keeps the result as a data bit. The send-out register 13 controls the input of a predetermined data bit output from the data read structure 11 by a data shift in accordance with a read clock Pck (first clock) and then, keeps the input data bit as a result of the control, and sends out the kept data bit by a data shift in accordance with a send-out clock Sck (second clock).

(Imaging Cell, Read Cell)

Figure 2:
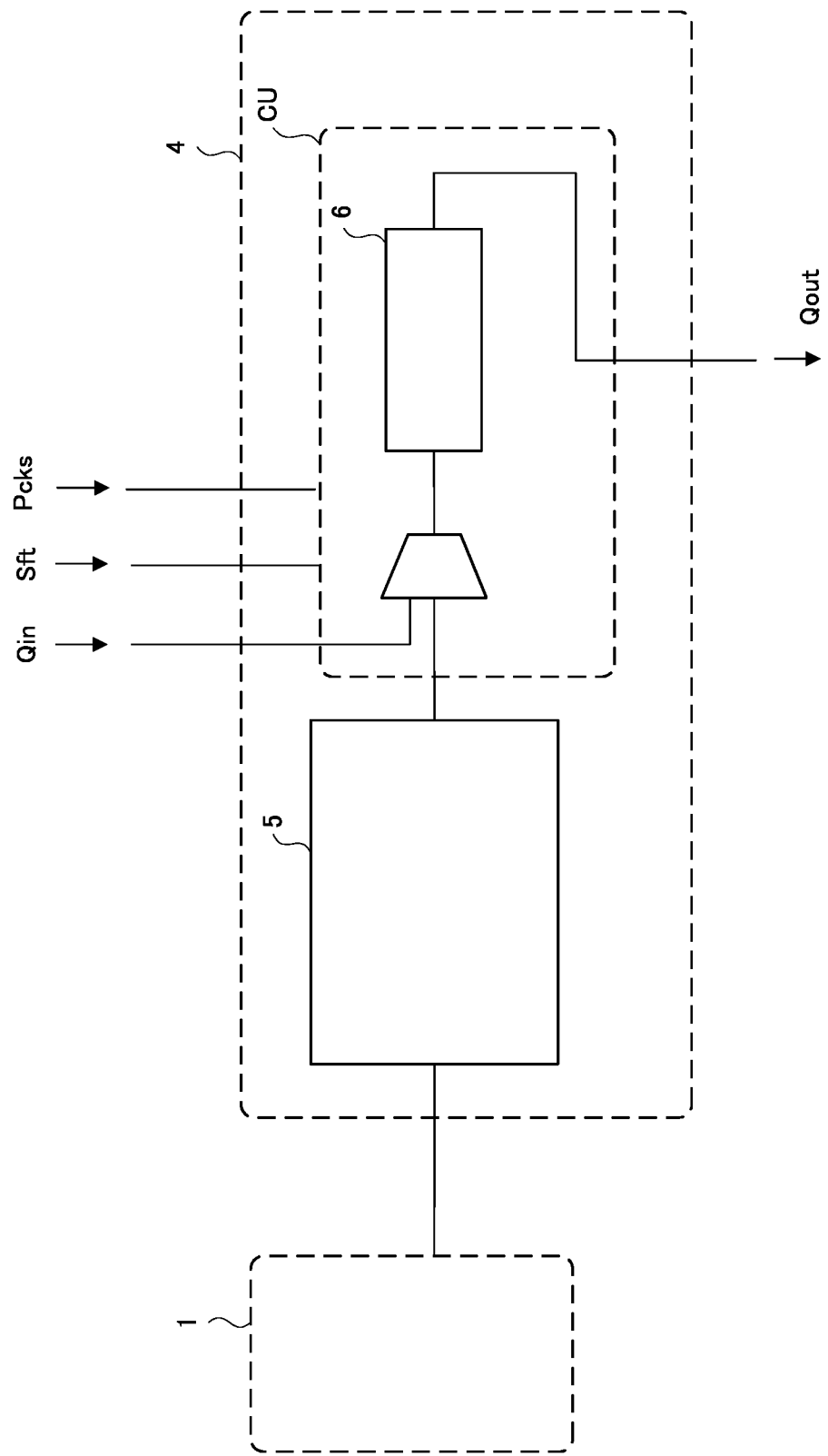
FIG. 2 is a block diagram showing a configuration of an imaging cell and a read cell.

FIG. 2 is a block diagram showing a configuration of the imaging cell 1 and a read cell 4. The read cell 4 includes the digitization circuit 5 and a counter unit CU. The counter unit CU has a shift register 6. The shift register 6 counts the digitized signal and keeps a data bit. An output terminal Qout of the counter unit CU is connected to an input terminal Qin of the next counter unit CU.

The counter unit CU switches the internal connections of the data read structure 11 between data recording and readout in accordance with a signal Sft to be input. Due to this, it is made possible to shorten the time to the next data read and it is made possible to continuously acquire image data in a shorter repeat time.

Figure 3:
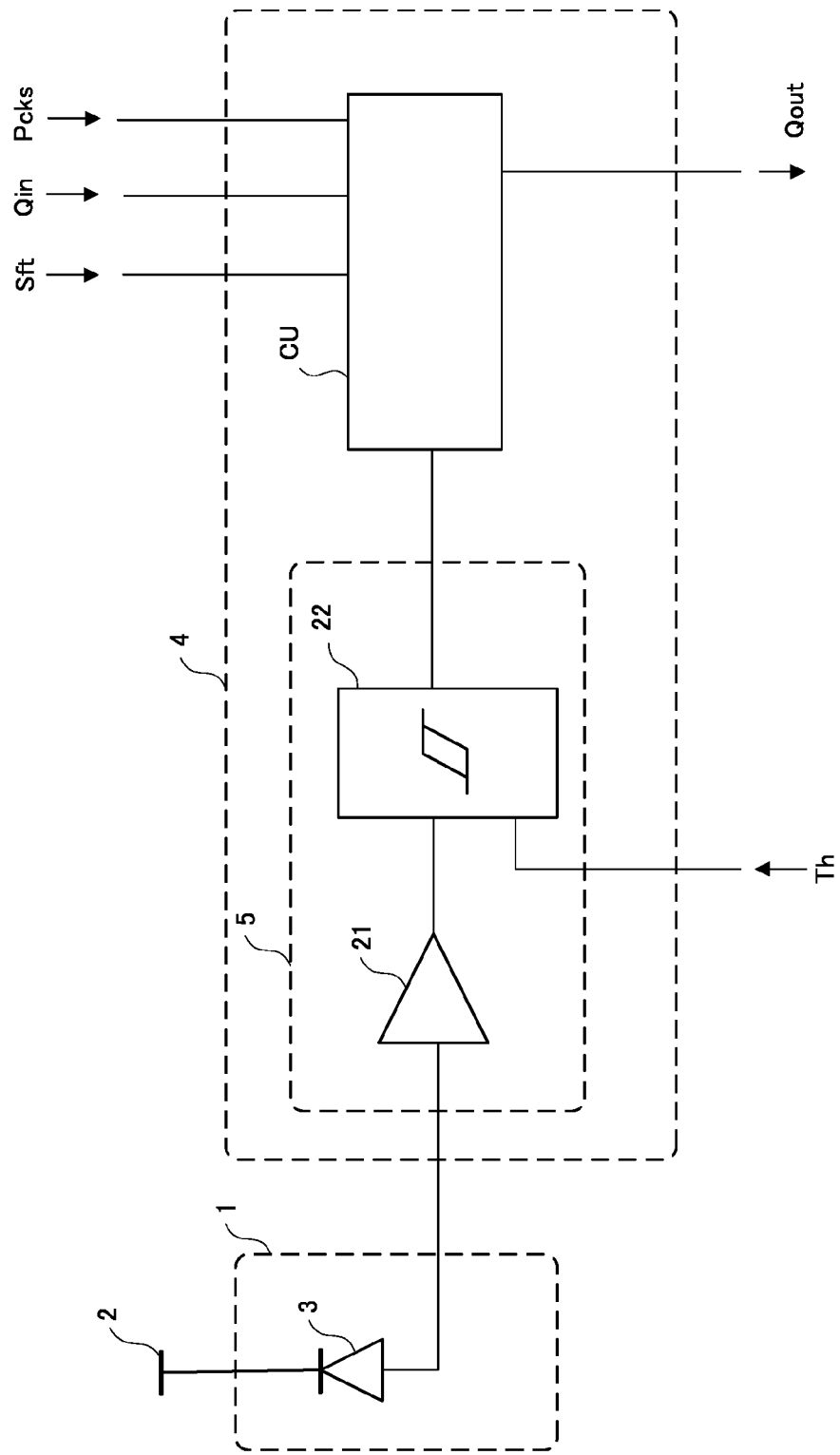
FIG. 3 is a block diagram showing a configuration of an imaging cell and a read cell.

FIG. 3 is a block diagram showing a configuration of an imaging cell and a read cell. In the radiation detector 100, the read cells 4 including these circuits are arranged in the form of a matrix together with the imaging cell 1. The imaging cell 1 has a photodiode 3. The photodiode 3 is applied with a reverse bias voltage and generates a current signal in response to the incidence of radiation.

The digitization circuit 5 has an amplifier 21 and a wave height discriminator 22. The amplifier 21 amplifies an input signal based on the current signal generated by the photodiode 3. The wave height discriminator 22 discriminates output signals based on the signal amplified based on a threshold voltage Th. The wave height discriminator 22 allows only a signal of radiation having energy in a predetermined range to pass. Due to this, a digital signal in accordance with the level of radiation energy is obtained. The counter unit CU counts the signal the wave height of which is discriminated and keeps a data bit.

(Send-Out Register)

Figure 4:
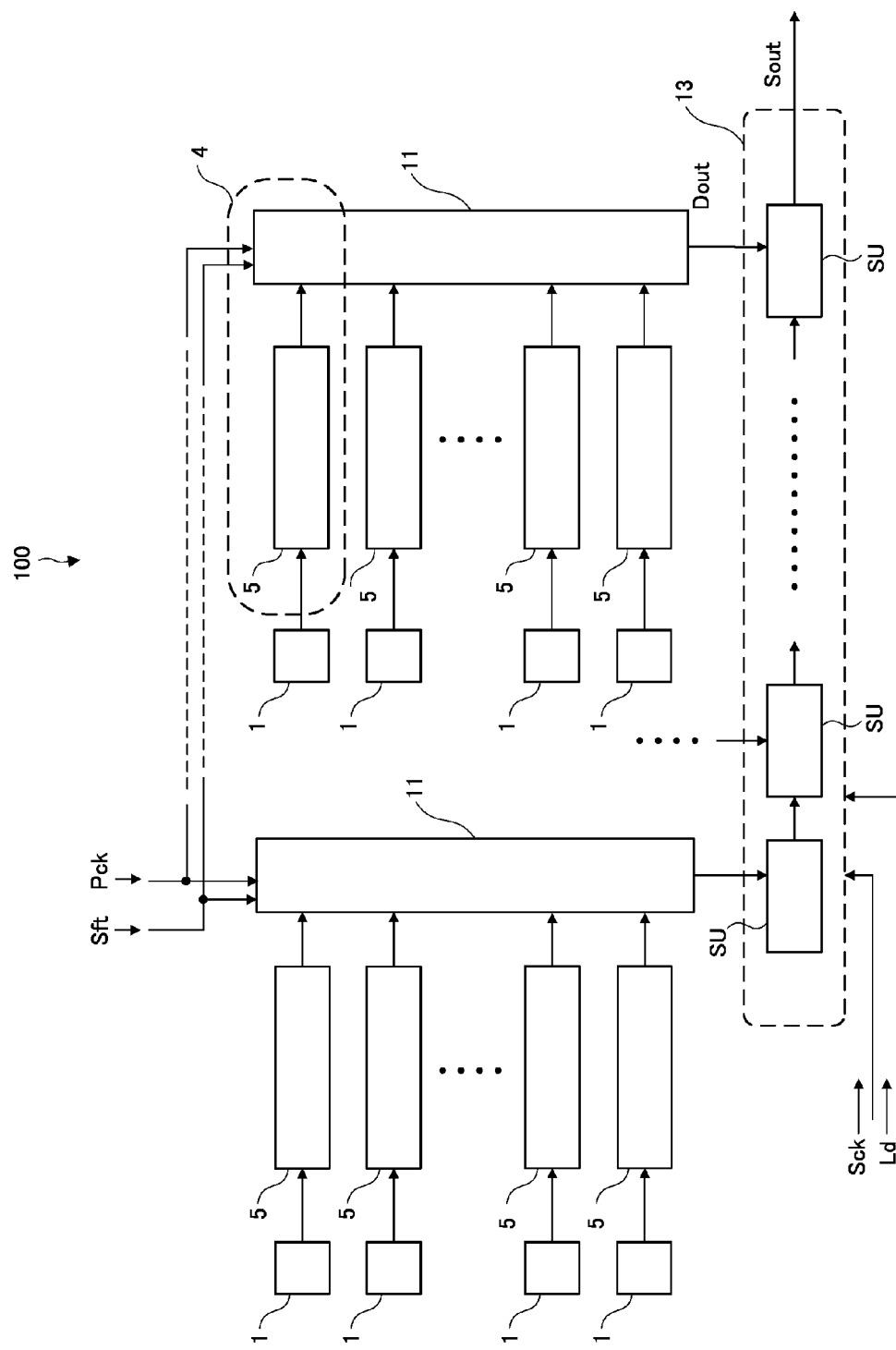
FIG. 4 is a block diagram showing a configuration of the radiation detector according to the first embodiment.

FIG. 4 is a block diagram showing a configuration of the radiation detector 100. The send-out register 13 includes shift units SU in the same number as that of the data read structures 11 and the output of the data read structure 11 is connected to each shift unit SU. Because of having such a structure, it is made possible to shorten the read time with a simple setting.

(Inside of Shift Unit)

Figure 5:
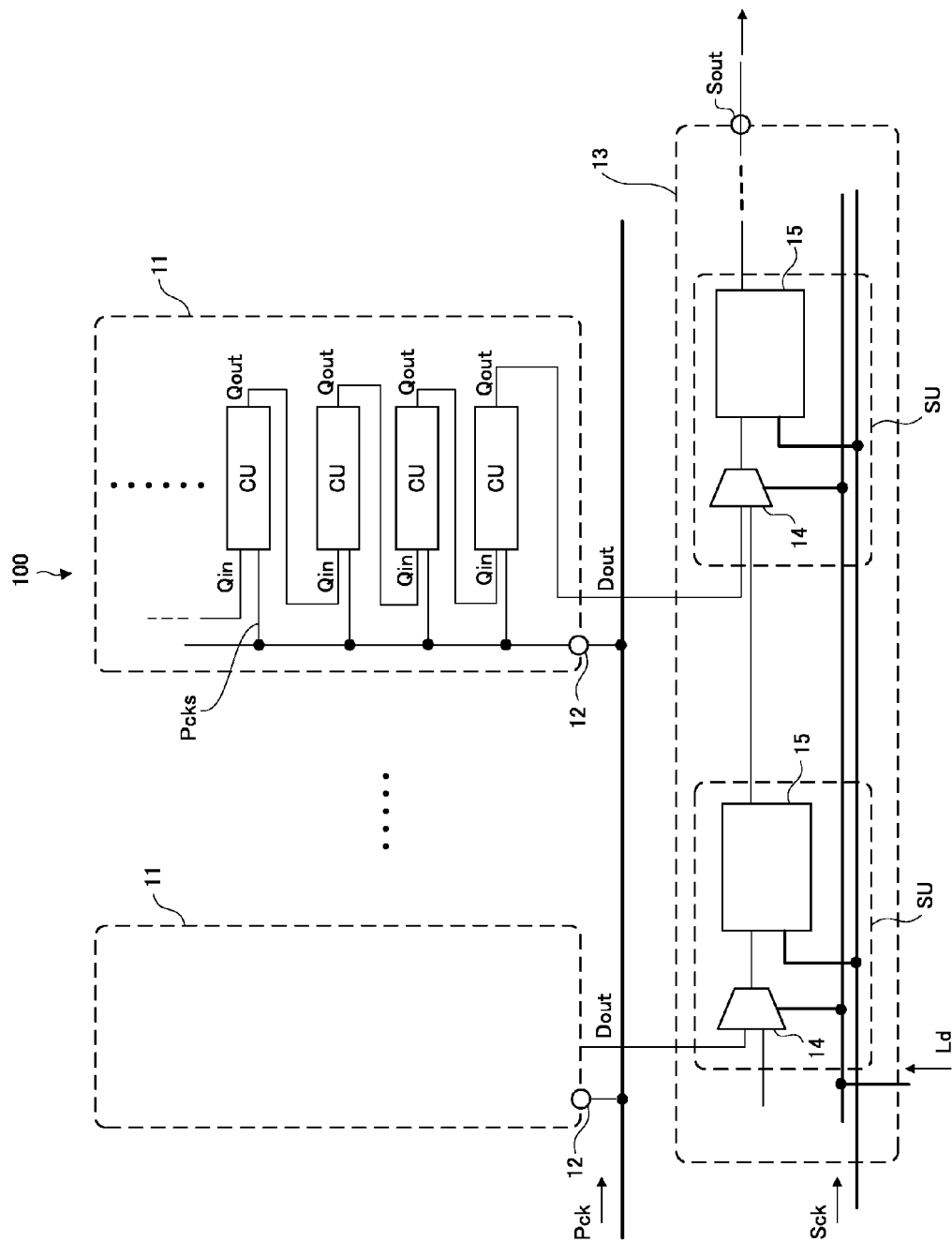
FIG. 5 is a block diagram showing a configuration of a data read structure and a send-out register.

FIG. 5 is a block diagram showing a configuration of the data read structure 11 and the send-out register 13. The data read structure 11 includes a plurality of the counter units CU. The counter unit CU switches the connections of the internal shift register 6 between data recording and readout by the control from outside.

Inside of the plurality of the data read structures 11, the terminals of the input terminals Qin and the output terminals Qout of the plurality of the counter units CU are connected alternately and the output terminal Qout of the counter unit CU, which is the last of the connection, is connected to the send-out register 13 as an output terminal Dout. From the outside of the radiation detector 100, the read clock Pck is input to each read structure 11 via a connection terminal 12. To the inside of the data read structure 11, a read clock Pcks is distributed and input to each counter unit CU.

Inside of the send-out register 13, the plurality of the shift units SU is connected continuously and the output terminal Dout of each read structure 11 is connected to the shift unit SU. The inside of the shift unit SU includes an intake circuit 14 (load switch unit) configured to take in the signal from the output terminal Dout as bit data and a bit register 15 configured to keep the bit data.

The intake circuit 14 switches between enabling and disabling the output of a predetermined data bit output from the data read structure 11 by the data shift in accordance with the read clock Pck. It is possible for the intake circuit 14 to limit the output of a data bit on the lower digit side by switching. Due to this, it is possible to send out only a data bit on the upper digit side to the bit register and to efficiently count only the part where radiation is strong.

Further, it is also possible for the intake circuit 14 to limit the output of a data bit on the upper digit side by switching. Due to this, it is possible to send out only a data bit on the lower digit side to the bit register and to efficiently count minute radiation.

For example, when it is possible to determine that acquisition of an image in a shorter repetition period is necessary by evaluating the image that has been once acquired without limiting the output of a data bit, it is made possible to omit a data bit of an upper digit or lower digit to make an attempt to optimize the continuous acquisition condition of image data.

By the send-out clock Sck being input to the send-out register 13 from outside of the radiation detector 100, inside of the send-out register 13, the send-out clock Sck is input to each shift unit SU. Then, the intake circuit 14 operates by a load signal Ld and reflects the signal output from the output terminal Qout in the bit register 15.

(Operation Example of Radiation Detector)

Next, an operation example of the radiation detector 100 is explained. The radiation detector 100 is considered, in which the number of bits of the counter unit CU is four and the number of the data read structures 11 is four. In such a case, the read clock Pck, the load signal Ld, and the send-out clock Sck are caused to operate in combination for the radiation detector 100. As a result of that, data bits are output in order from an output terminal Sout.

Transmission of the signal to be input to the radiation detector 100 from outside is controlled by the control unit of an external device. It is possible to set the timing of transmission in advance in the external device at the time of measurement of radiation detection and the external device is not limited in particular.

Figure 6:
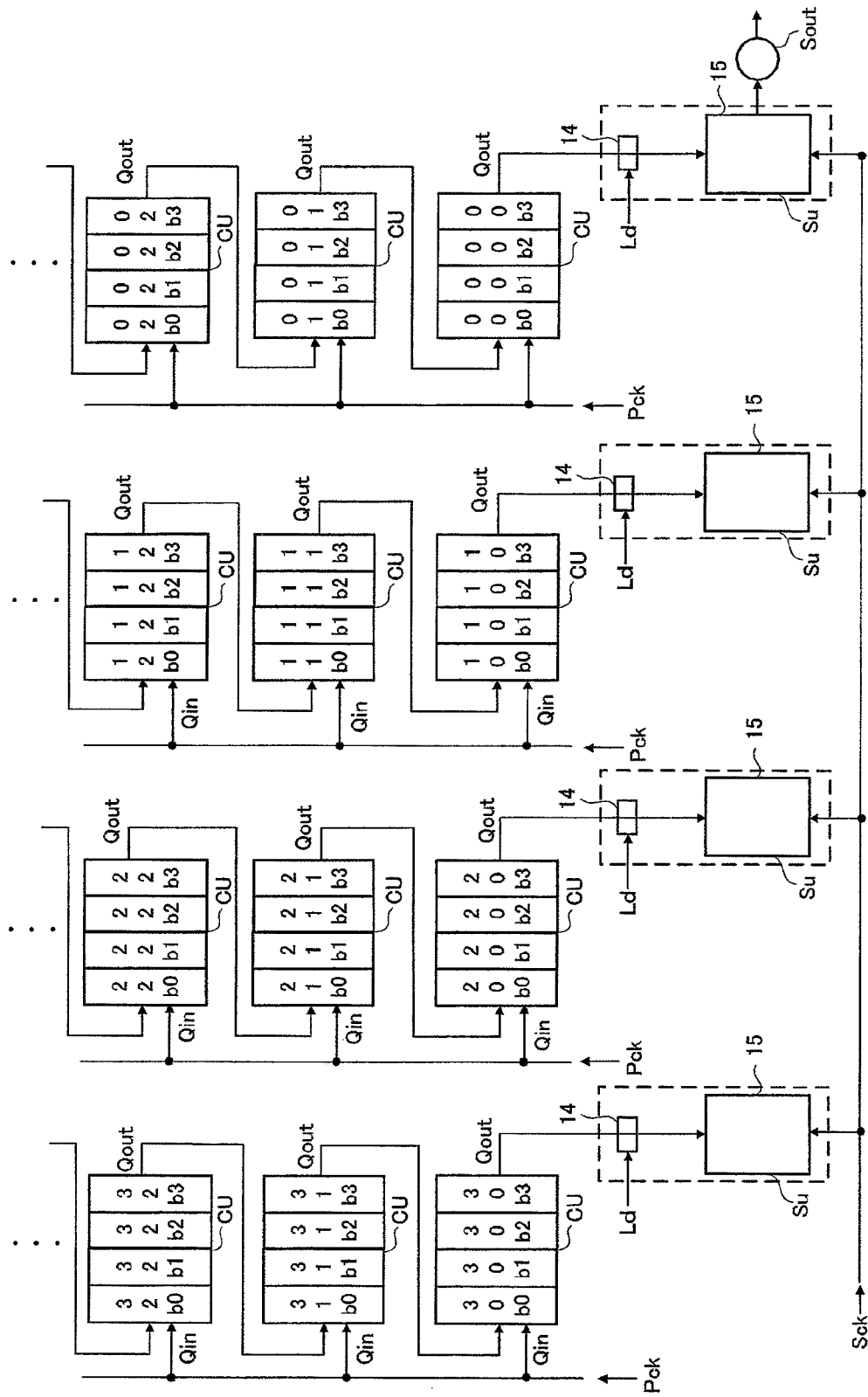
FIG. 6 is a diagram showing one scene of an operation example of the radiation detector according to the first embodiment.

FIG. 6 to FIG. 12 are diagrams each showing one scene of the operation example of the radiation detector 100. As shown in FIG. 6, the digitized detection signal is kept in the counter unit CU as a data bit. In FIG. 6, a notation system is adopted, in which each data bit is represented as [M-th column. N-th row. n-th bit] in correspondence to the column and the row of the counter unit CU and the order of the bit within the counter unit according to the position where the data bit is kept in the counter unit CU. Consequently, for example, [3. 0. b3] means the [value of the data bit of the third bit of the counter unit CU in the third column and in the zeroth row]. For the convenience of explanation, the arrangement of the counter units CU along the read direction of the data read structure 11 is called "column" and the arrangement of the counter units CU along the direction orthogonal to the read direction is called "row". Further, the column located on the leftmost side in the figure is called "zeroth column" and the row located on the lowermost side is called "zeroth row".

Figure 7:
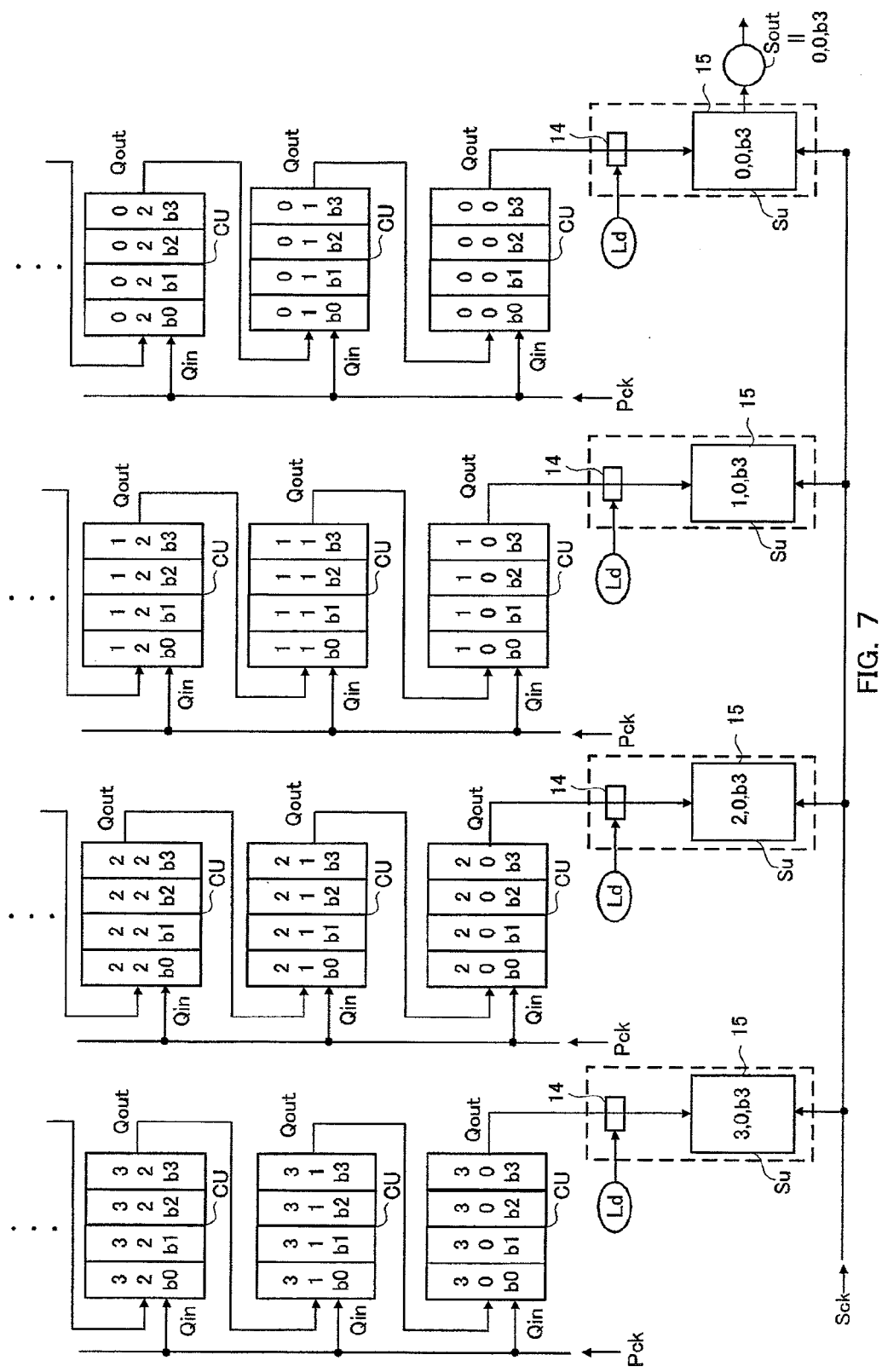
FIG. 7 is a diagram showing one scene of the operation example of the radiation detector according to the first embodiment.

In the state where the data bits are kept in the counter unit CU, by the load signal Ld being input to the intake circuit 14 by the control from outside as shown in FIG. 7, the shift unit SU takes in the value of each data bit of the third bit of the counter units CU in the zeroth row, that is, [3. 0. b3], [2. 0. b3], [1. 0. b3], and [0. 0. b3]. Then, to the output terminal Sout, the bit data [0. 0. b3] is read from the shift unit SU in the zeroth column.

Figure 8:
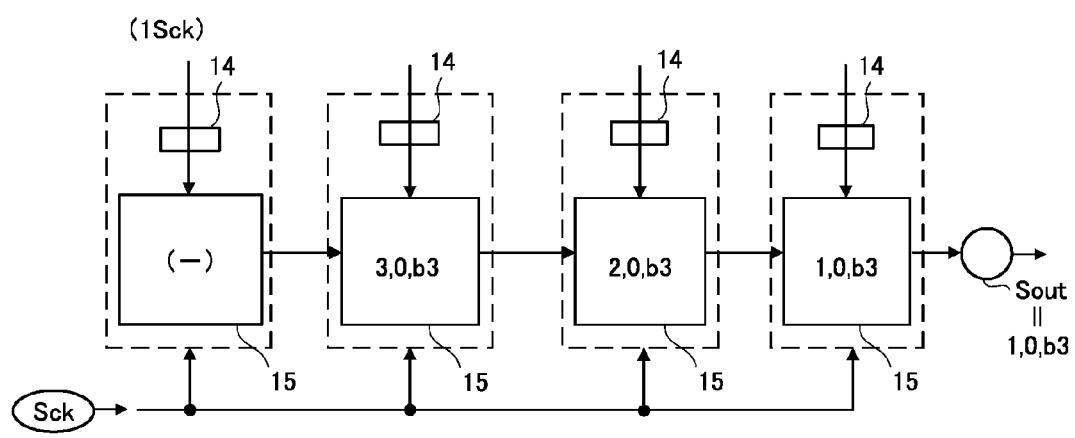
FIG. 8 is a diagram showing one scene of the operation example of the radiation detector according to the first embodiment.

Next, as shown in FIG. 8, upon receipt of the send-out clock Sck, the shift unit SU sends out the value of each data bit one by one from the third column to the zeroth column. Then, to the output terminal Sout, the data bit [1. 0. b3] is read from the shift unit SU in the zeroth column. Further, as shown in FIG. 9 and FIG. 10, such processing in which upon receipt of the send-out clock Sck, the shift unit SU sends out each data bit and to the output terminal Sout, bit data is read from the shift unit SU in the zeroth column is performed until the last data bit in the third column is read.

Figure 10:
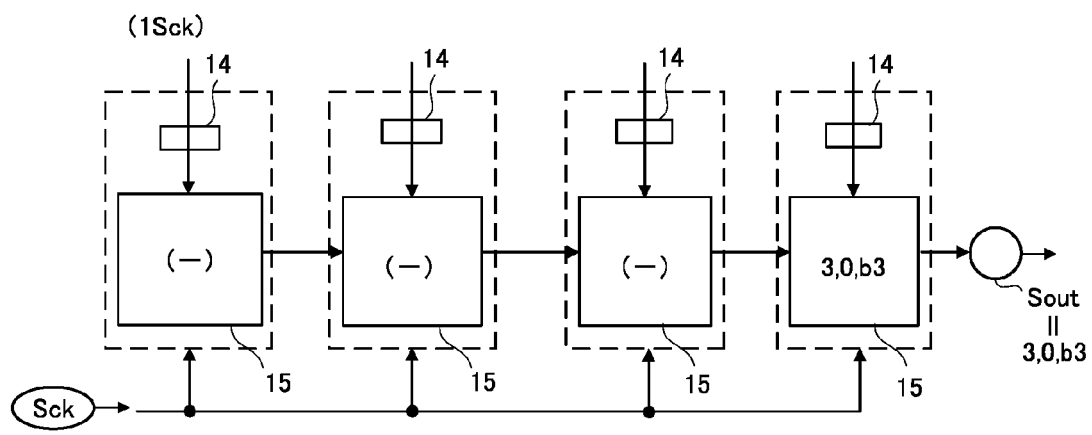
FIG. 10 is a diagram showing one scene of the operation example of the radiation detector according to the first embodiment.
Figure 11:
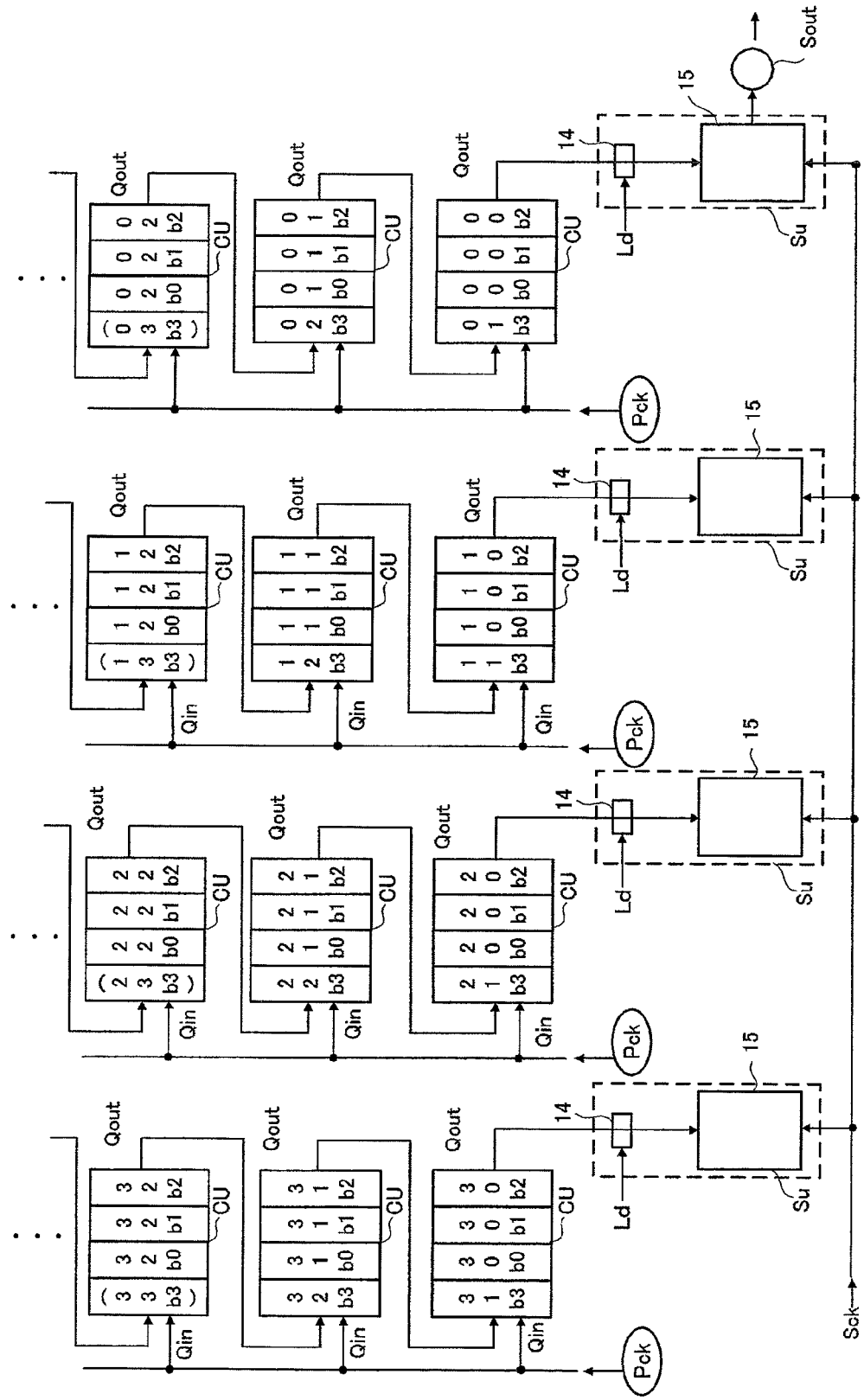
FIG. 11 is a diagram showing one scene of the operation example of the radiation detector according to the first embodiment.
Figure 12:
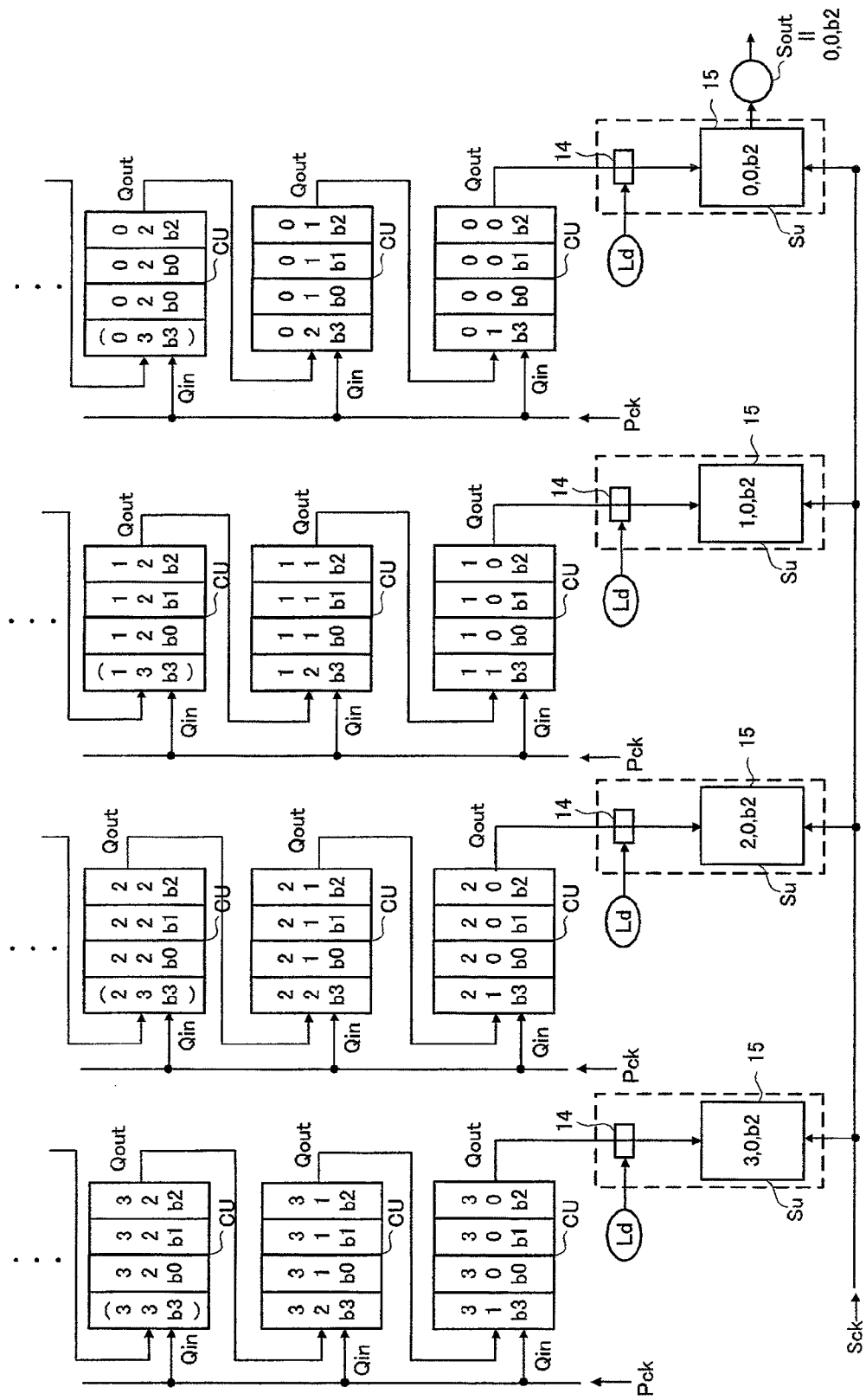
FIG. 12 is a diagram showing one scene of the operation example of the radiation detector according to the first embodiment.

After all the data of the third bit in the zeroth row is read in this manner, by sending the read clock Pck once as shown in FIG. 11, the data bit is shifted only by one inside of the counter unit CU connected in the data read structure 11. In this state, if the load signal Ld is sent as shown in FIG. 12, to each shift unit SU, the data of the second bit in the zeroth row in each column is set. After this, by continuing the processing of FIG. 8 to FIG. 12 repeatedly, it is made possible to read all the data bits within the counter unit CU.

Figure 9:
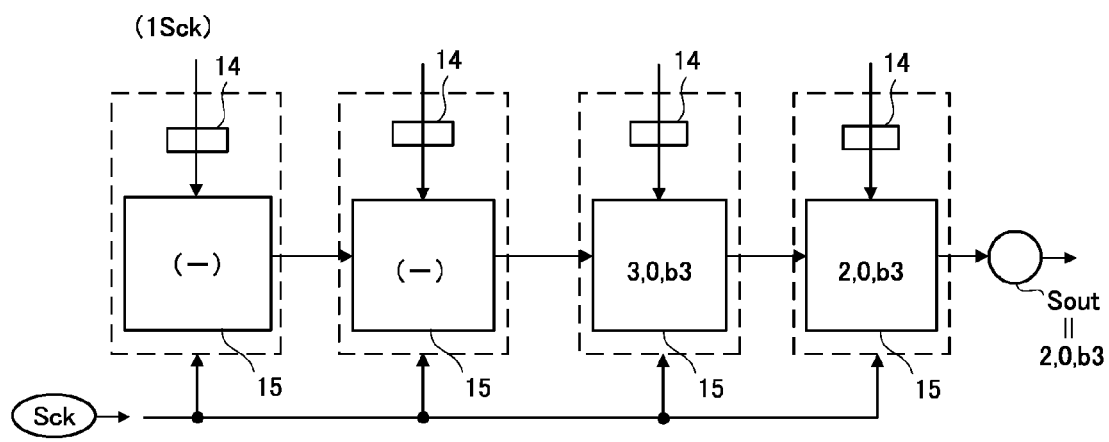
FIG. 9 is a diagram showing one scene of the operation example of the radiation detector according to the first embodiment.

On the other hand, when read is omitted (for example, when the third bit of each counter unit CU is omitted), from the point of time when the counter units CU shown in FIG. 6 are connected in a series inside of the read structure 11, the processing to input the load signal Ld shown in FIG. 7 and the processing shown in FIG. 8 to FIG. 10 following the input are omitted and the processing to input the read clock Pck shown in FIG. 11 is performed. Then, by omitting the processing shown in FIG. 7 to FIG. 10 each time the third bit data of each counter unit CU appears immediately before the intake circuit 14, it is made possible to read by omitting the third bit data of all the counter units CU.

(Explanation of Operation Example by Flowchart)

Figure 13:
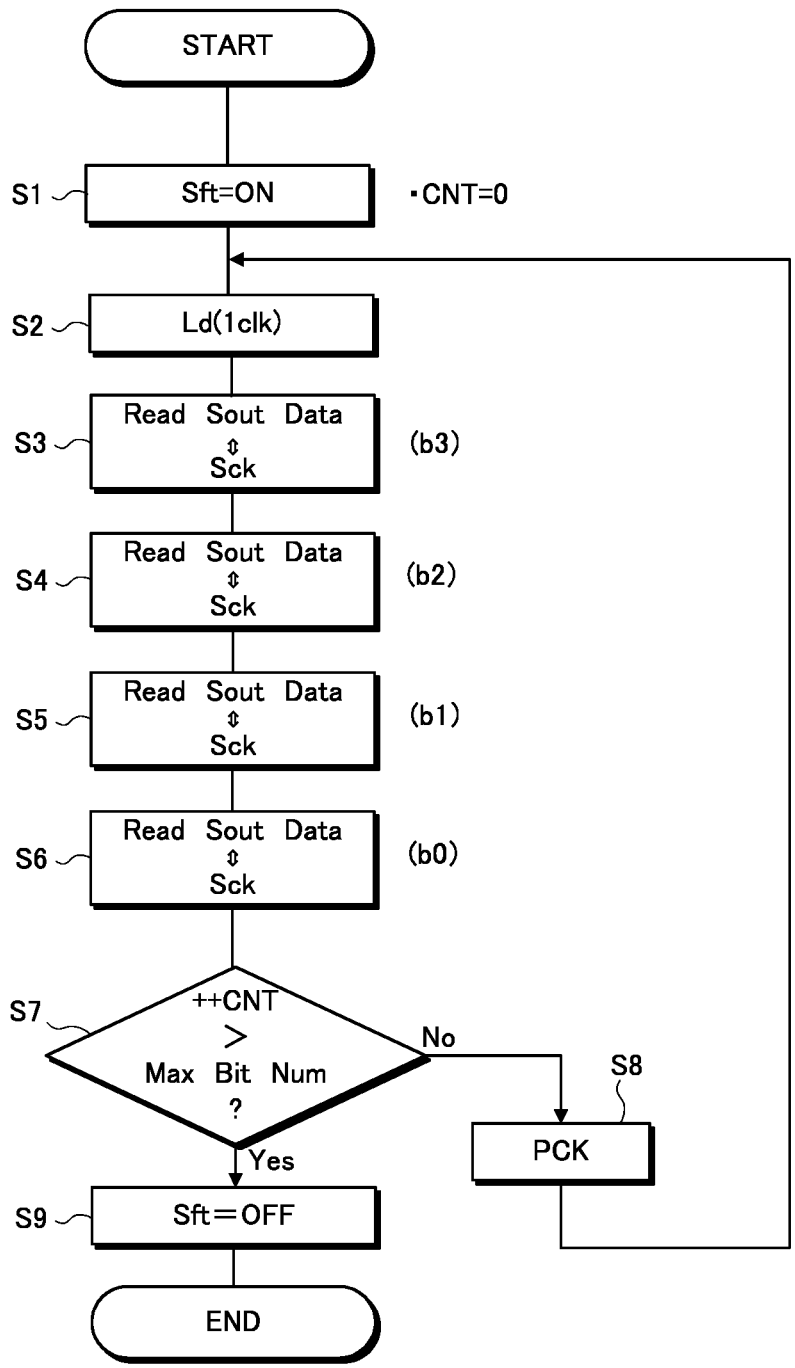
FIG. 13 is a flowchart showing the operation example of the radiation detector according to the first embodiment.
Figure 14:
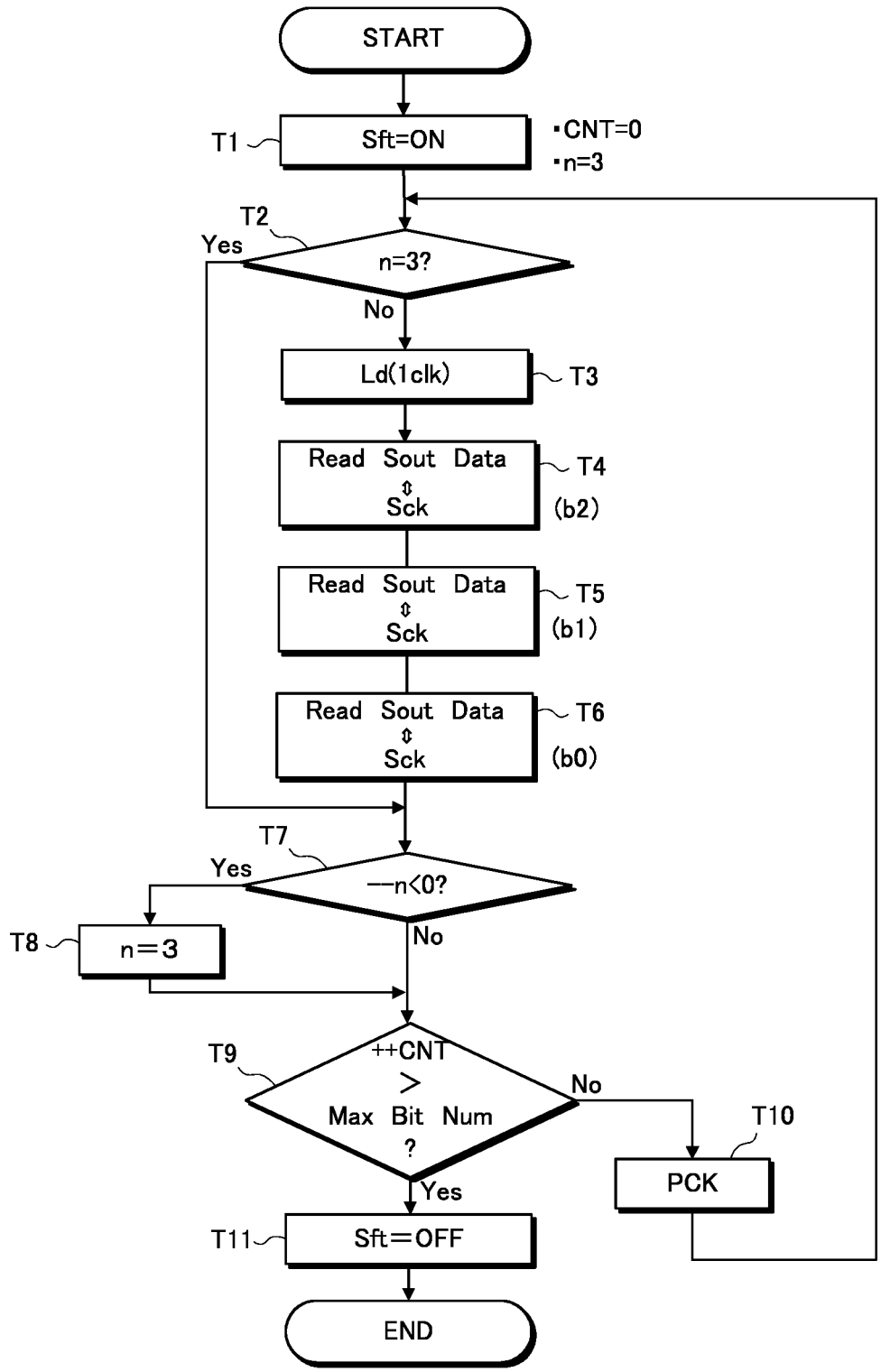
FIG. 14 is a flowchart showing the operation example of the radiation detector according to the first embodiment.

The processing when read is not omitted and the processing when read is omitted described above are explained using a flowchart. FIG. 13 and FIG. 14 are each a flowchart showing the operation of the radiation detector.

The flowchart of FIG. 13 shows the processing when read is not omitted. First, upon receipt of the signal Sft, the data read structure 11 switches the state of the internal circuit from data recording to readout (step S1). The intake circuit 14 receives the load signal Ld and the shift unit SU reads data bits from the data read structure 11 (step S1).

Next, the data bit (third bit) in the zeroth column is read from the output terminal Sout and after the read, upon receipt of the send-out clock Sck, each shift unit SU sends out the data bit and repeats the processing to read and send out the data bit (step S3).

Then, from the output terminal Sout, the data bit (second bit) in the zeroth column is read and after the read, by the send-out clock Sck, each shift unit SU sends out the data bit and repeats the processing to read and send out the data bit (step S4). Further, as to the first and zeroth data bits, the same processing to read and send out is repeated (steps S5, S6).

Whether or not all the processing is completed is determined (step S7) and when all the processing is not completed yet, the read clock Pck is sent out (step S8), the processing returns to step S1, and the next data is read. When all the processing is completed, the send out of the signal Sft is terminated (step S9) and the series of processing is terminated.

The flowchart of FIG. 14 shows processing when read is omitted for the third bit data of all the pixels. First, upon receipt of the signal Sft, the data read structure 11 switches the state of the internal circuit from data recording to readout (step T1). The external control unit determines whether or not the order of the data bit to be read is the third bit in accordance with the setting (step T2). When the order of the data bit is the third bit, the processing proceeds to step T7. When the order of the data bit is not the third bit, the load signal is transmitted from outside. Then, the intake circuit 14 receives the load signal Ld and the shift unit SU reads the data bit from the data read structure 11 (step T3).

Next, the data bit (second bit) in the zeroth column is read from the output terminal Sout and after the read, by the send-out clock Sck, each shift unit SU sends out the data bit and repeats the processing to read and send out the data bit (step T4).

Then, the data bit (first bit) in the zeroth column is read from the output terminal Sout and after the read, by the send-out clock Sck, each shift unit SU sends out the data bit and repeats the processing to read and send out the data bit (step T5). Further, as to the zeroth data bit, similarly, the processing to read and send out is repeated (step T6).

Next, whether or not the order of the data bit to be read reaches the zeroth bit is determined (step T7) and when the zeroth bit is not reached, the processing proceeds to step T9. When the zeroth bit is reached, the target to be read is returned to the third bit (step T8).

Next, whether or not all the processing is completed is determined (step T9) and when all the processing is not completed yet, the read clock Pck is sent out (step T10), the processing returns to step T2, and the next data is read. When all the processing is completed, the send out of the signal Sft is terminated (step T11) and the series of processing is terminated.

(Explanation of Operation Example by Timing Chart)

Figure 15:
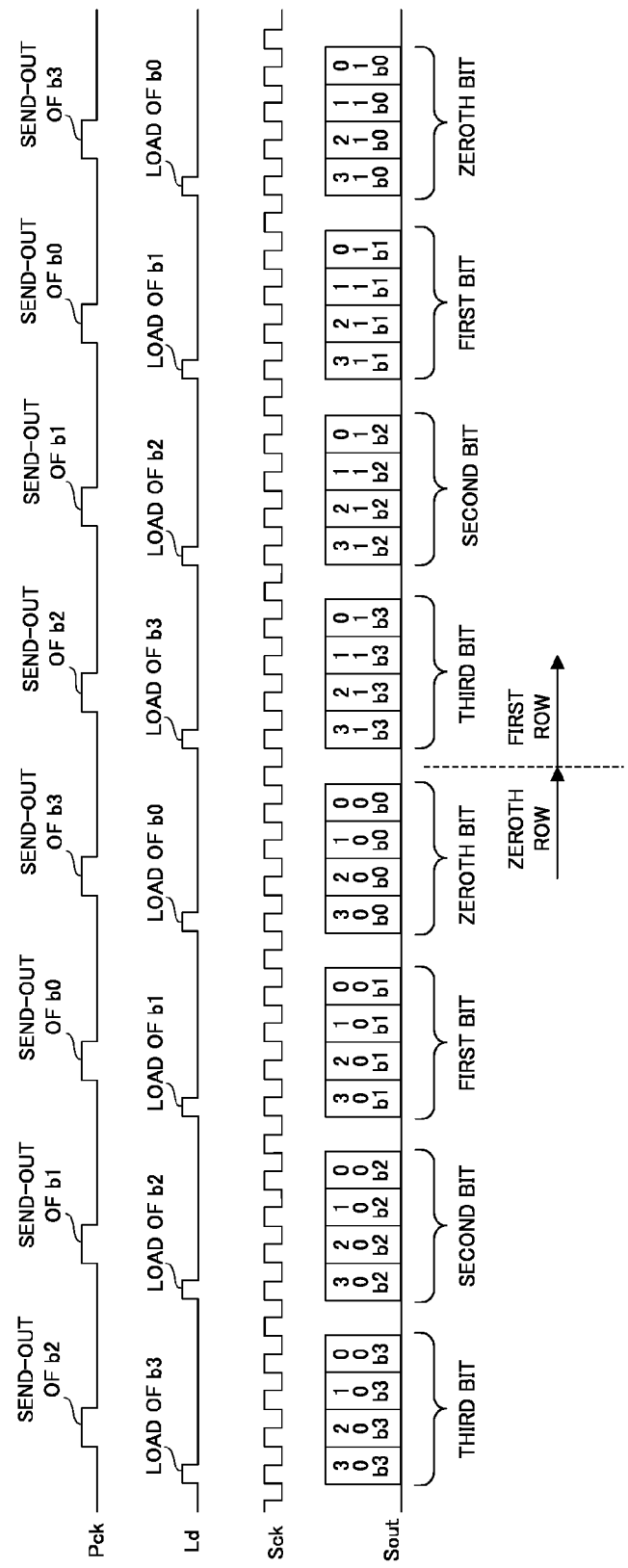
FIG. 15 is a timing chart showing the order of data that appears at an output terminal Sout when read is not omitted.

FIG. 15 is a timing chart showing the order of data that appears at the output terminal Sout when read is not omitted. Here, it is assumed that b3 . . . b0 are each piece of bit data of 4 bits of the counter unit CU and in this case, it is assumed that data appears from the output terminal Dout in the order from b3 as the head.

As shown in FIG. 15, each bit of the data that appears at the output terminal Sout is represented as [M-th column. N-th row. n-th bit] as in the example of FIG. 6 for identification. Here, as shown in FIG. 15, when each of the read clock Pck, the load signal Ld, and the send-out clock Sck is controlled, at Sout, the data of the third bit in each column in the zeroth row is output first, then the data of the second bit is output, and thus the data up to the zeroth bit is output. Then, similarly, the output of the data of the third bit in each column in the first row follows and data is output continuously.

In FIG. 15, a gap corresponding to a piece of data is shown between the series of data of each bit to make FIG. 15 easy-to-see, but, this gap is not necessary in fact. Further, in FIG. 15, the read clock Pck to send out the first b3 data is omitted. In the manner described above, all the bit data stored essentially in the radiation detector 100 is read. However, it is possible to reduce the amount of data to be read and to shorten the read time by changing the signal control method.

Figure 16:
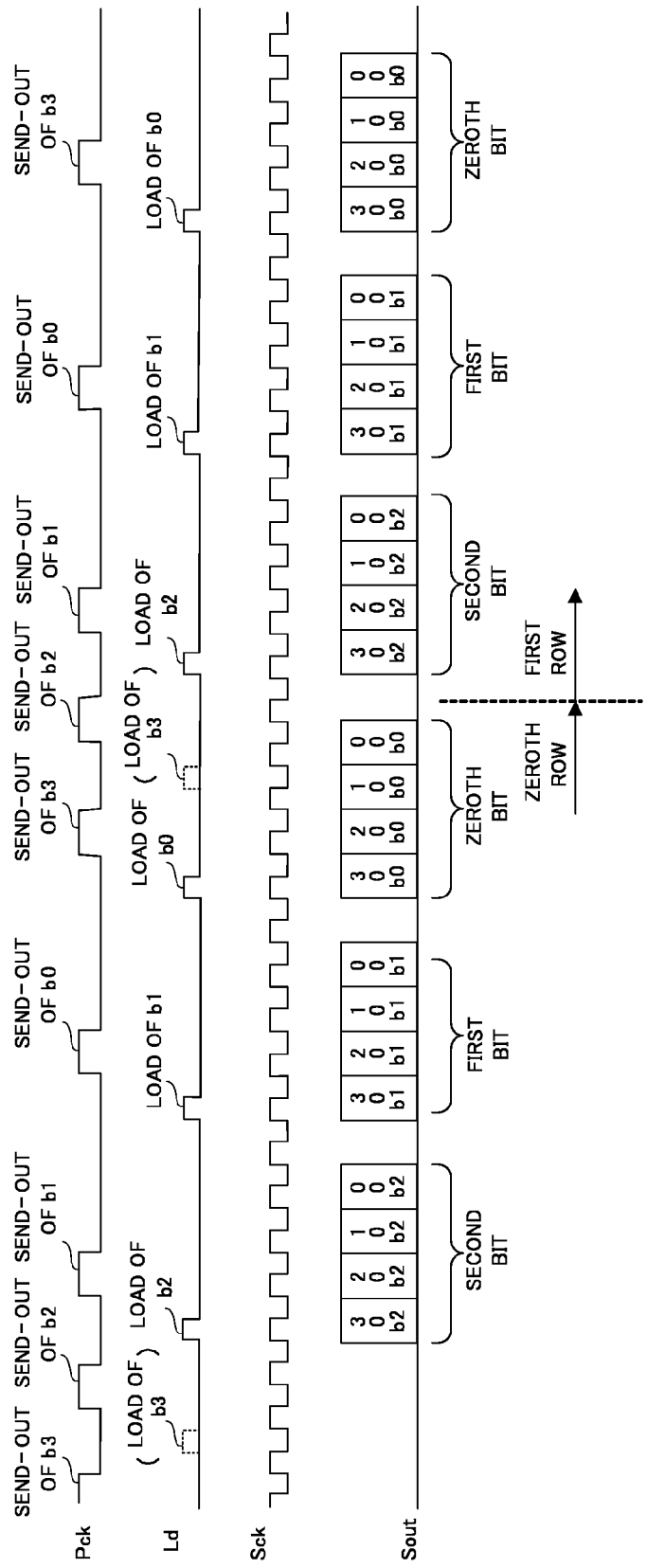
FIG. 16 is a timing chart showing the order of data that appears at the output terminal Sout when read is omitted.

In the example in FIG. 16, the read of the data bit b3 of each counter unit CU is omitted. Because of this, the signal control of the read clock Pck and the load signal Ld is performed in a pattern different from that of the example of FIG. 15. Here, first, the load signal Ld output to load the data bit b3 is omitted, which should be normally performed immediately after the read clock Pck to send out the data bit b3. Then, the read clock Pck to send out the data bit b2 is output at a timing half the normal timing.

That is, the load signal Ld of the data bit the read of which is omitted is omitted and at the same time, the interval to the read clock Pck that immediately follows is reduced. In this manner, it is made possible to reduce the data bit amount to be read without changing the time interval of arrangement of the data sent from the output terminal Sout and to shorten the time necessary for the read as shown in FIG. 16.

Second Embodiment

Transfer Register

Figure 17:
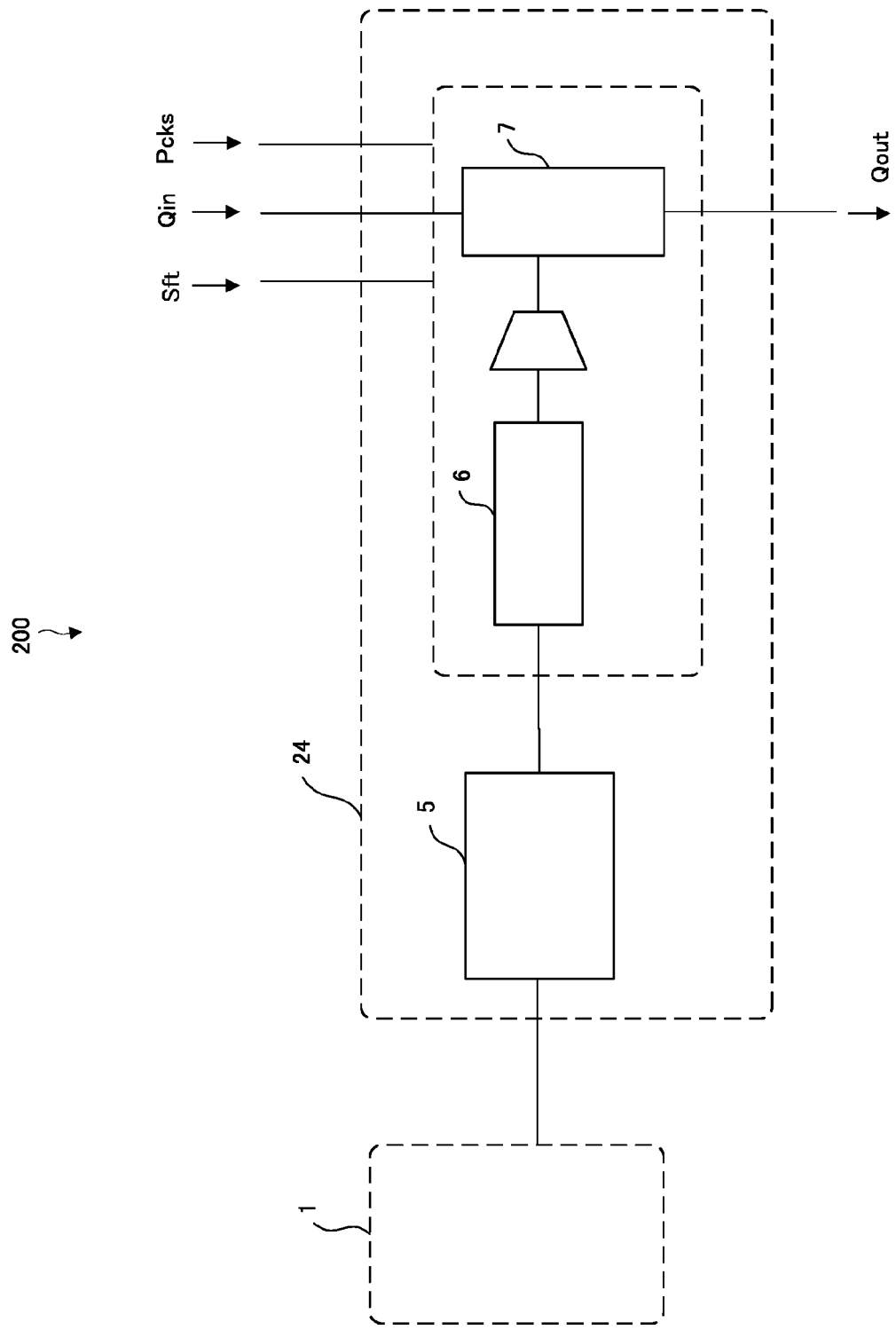
FIG. 17 is a block diagram showing a configuration of an imaging cell and a read cell of a radiation detector according to a second embodiment.

FIG. 17 is a block diagram showing a configuration of the imaging cell and the read cell of a radiation detector 200. The counter unit CU has the shift register 6 and a transfer shift register 7. The shift register 6 reflects data in the transfer shift register 7 after rearranging the arrangement of each data bit in accordance with a pattern based on a table determined in advance. Then, the transfer shift register 7 reflects the data bit kept in the shift register 6 by the control from outside.

Third Embodiment

Rearrangement of Bit Position

In the above-described embodiments, read is performed in a predetermined bit position recorded in the shift register, but, it may also be possible to read after rearranging the bit positions. FIG. 18 is an example of a table showing the predetermined bit positions recorded in the shift register. In the example of FIG. 18, the number of bits of the shift register 6 is set to 16 and in the upper row, the bit positions recorded originally in the shift register 6 are shown and in the lower row, the bit positions rearranged when reflected in the transfer shift register 7 are shown.

Figure 19:
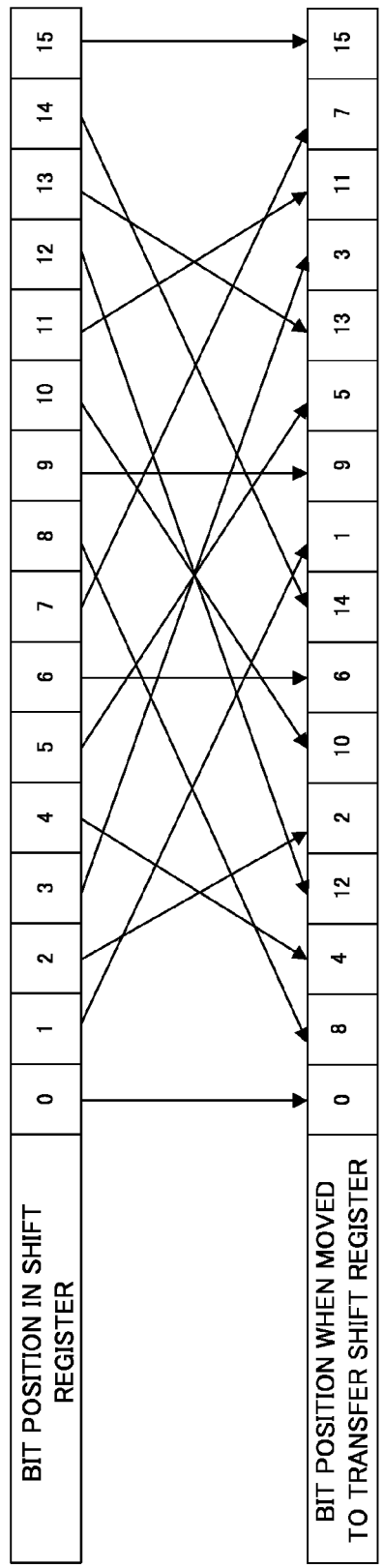
FIG. 19 is a table showing rearranged bit positions recorded in a transfer shift register.

FIG. 19 is a table showing the rearranged bit positions recorded in the transfer shift register. That the read by the rearrangement of bits using this table is effective is explained below. When data is not reduced, the interval of the output of the read clock Pck is quite constant.

Figure 20:
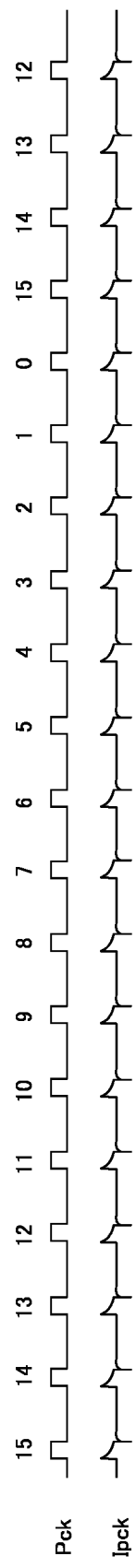
FIG. 20 is a diagram showing an example of a 16-bit read clock and circuit current.

FIG. 20 is a diagram showing an example of a 16-bit read clock and a circuit current. In the example shown in FIG. 20, all the data is read without performing rearrangement. In FIG. 20, the bit position to be output is indicated by a numeral on the waveform of each read clock Pck. It is assumed that the read starts from data bit b15 and is performed up to data bit b0.

Because the read clock Pck is distributed in all the counter units CU, it is necessary for the read clock Pck to be relayed and amplified on the way. However, for a detector including a larger number of counter units CU, the distribution of the read clock Pck becomes a heavier burden due to the influence of the capacitance etc. that the device of the counter unit CU itself and the circuit wiring itself on the way have.

Figure 21:
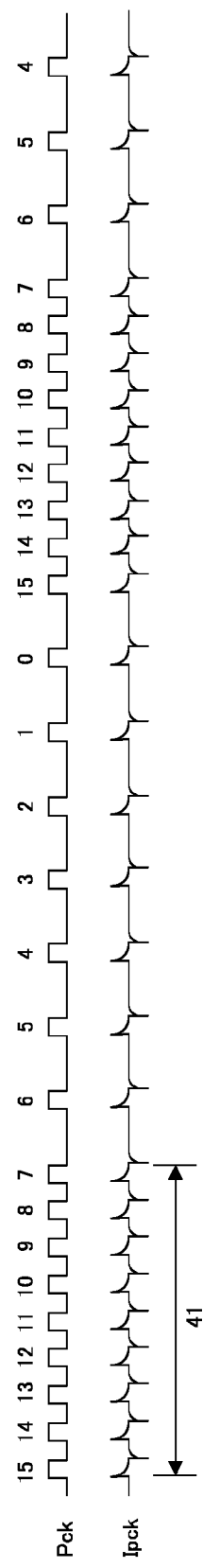
FIG. 21 is a diagram showing an example of a read clock reduced to 8 bits and circuit current.

FIG. 20 is a diagram showing an example of a current waveform that needs to be driven by the read clock Pck and a circuit current Ipck to output the read clock Pck in this case. FIG. 21 is a diagram showing an example of the read clock reduced to 8 bits and the circuit current. In the example shown in FIG. 21, the read in FIG. 20 is reduced from 16 bits to 8 bits.

In this case, the eight data bits from the 16-th data bit b15 at the head are not read, and therefore, the interval of the read clock Pck is reduced.

A section 41 is a section half the section that is read. Then, as to the circuit current Ipck in the section 41, the density of current increases obviously. It is necessary for the circuit that outputs the read clock Pck to deal with the section 41 that requires current having such a high density, resulting in the burden to the clock output.

Figure 22:
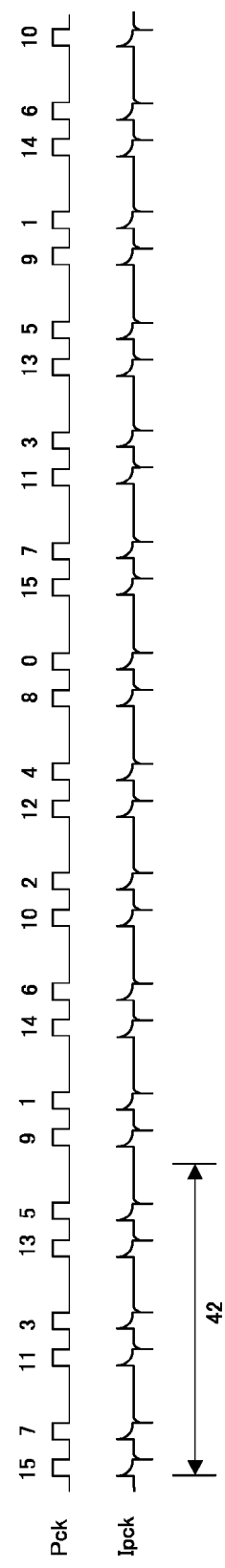
FIG. 22 is a diagram showing an example of a read clock reduced to 8 bits and circuit current.

On the other hand, FIG. 22 is a diagram showing an example of the read clock reduced to 8 bits by rearrangement and the circuit current. In the example shown in FIG. 22, the table shown in FIG. 18 is applied and the read is reduced from 16 bits to 8 bits similarly. The arrangement of bits shown in FIG. 22 appears in the order shown in the lower row in the table of FIG. 18. In the example of FIG. 22, the arrangement of bits is expressed by rearranging using the numeral indicating the waveform of the read clock Pck. In the rearrangement, bits neighboring each other in the original arrangement are arranged so as not to neighbor each other.

In the example shown in FIG. 22, in a section 42 the length of which is the same as that of the section 41 shown in FIG. 21, the density of the circuit current Ipck becomes obviously lower compared to the case of the section 41. Further, when viewing the entire distribution of the circuit current Ipck, there is no portion where current gathers extremely in the section 42 compared to the section 41 and obviously, the burden of the circuit that creates the read clock Pck is reduced. As described above, by rearranging the bits to be read, it is made possible to reduce the influence of the burden of current caused by an increase in the density of the Pck clock when reducing the number of data read bits.

Fourth Embodiment

Plurality of Output Terminals

Figure 23:
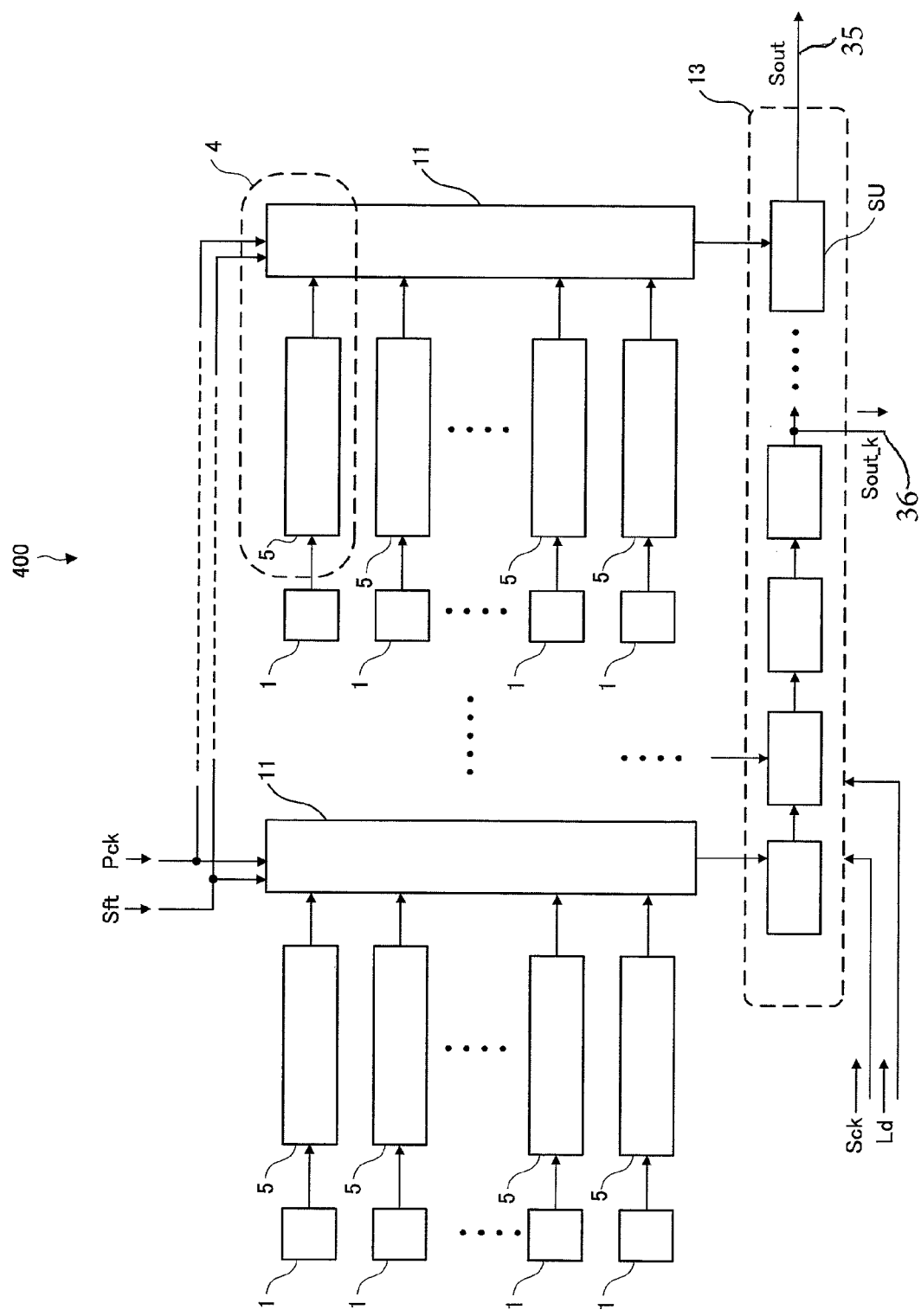
FIG. 23 is a block diagram showing a configuration of a radiation detector according to a fourth embodiment.

FIG. 23 is a block diagram showing a radiation detector 400. The send-out register 13 having a plurality of bits produces an output from both a terminal 35 at the end and a terminal 36 on the middle of the series of the shift units SU. In the example shown in FIG. 23, the number of the shift units SU is set to eight and one output terminal Sout_k is set on the output side of the fourth shift unit SU from the left. The shift unit SU reads data bit using both the output terminal Sout_k and the output terminal Sout at the end. Due to this, it is possible to read in time half the time when only the output terminal Sout is used.

Fifth Embodiment

Bypass

Figure 24:
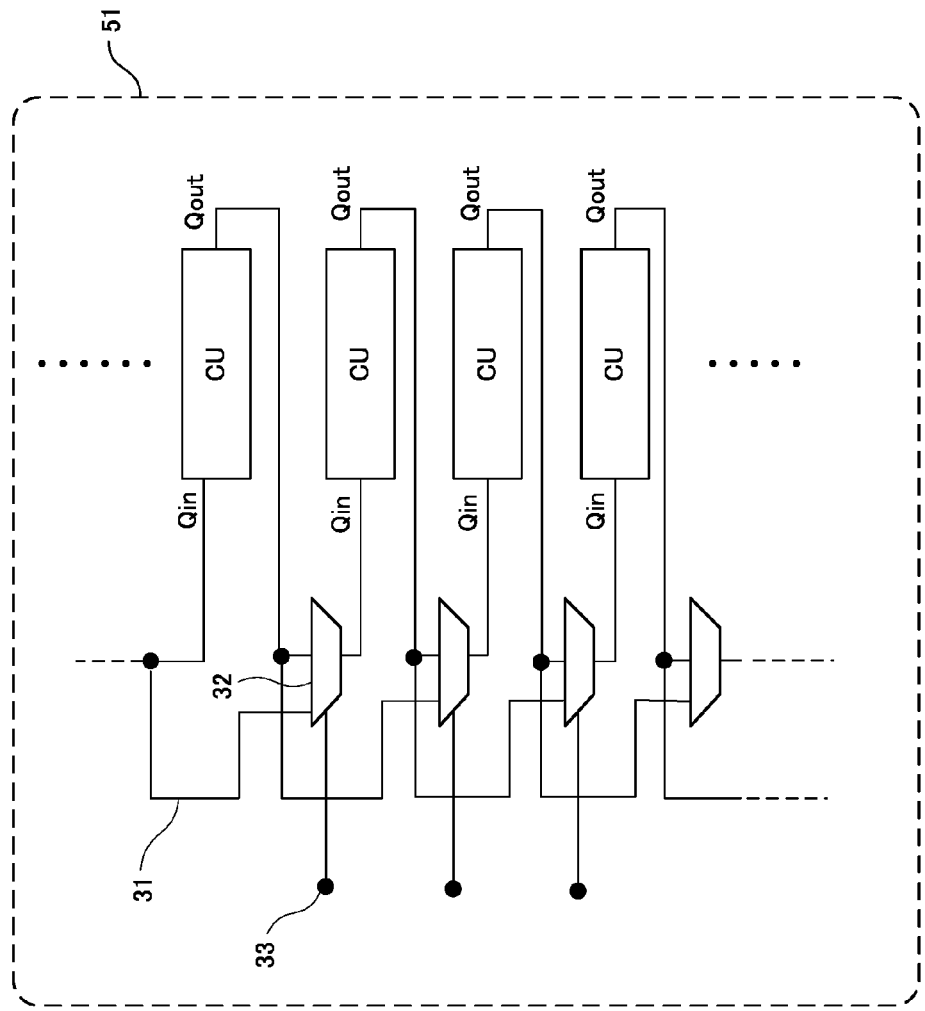
FIG. 24 is a block diagram showing a configuration of a data read structure according to a fifth embodiment.

In the above-described embodiments, respective counter units CU are connected to each other so that the output terminal Qout of one counter unit CU is connected to the input terminal Qin of the next counter unit CU, but, it may also be possible for the output terminal Qout of one counter unit CU to be connected to the input terminal Qin of the next counter unit CU and to a bypass 31 configured to connect to the input terminal Qin of the next counter unit CU. FIG. 24 is a block diagram showing the configuration of a data read structure 51 having a bypass. The bypass 31 has a configuration that excludes a specific counter unit CU of the plurality of counter units CU the inputs and the outputs of which are connected in series to each other from the data read structure 11. A bypass selection circuit 32 determines selection or unselection of the bypass 31.

When a specific counter unit CU malfunctions inside of the data read structure 11, it is no longer possible to perform data read of the whole of the data read structure 11 to which the counter unit CU belongs. Consequently, by providing the bypass 31 and selecting the bypass 31 by the bypass selection circuit 32 in response to an instruction (measures to activate the selection circuit) from a connection terminal 33 when a malfunction occurs, it is made possible to read the data of the other counter unit CU that does not malfunction by bypassing the counter unit CU that malfunctions.

DESCRIPTION OF SYMBOLS 1 imaging cell
 2 bias potential supply source
 3 photodiode
 4 read cell
 5 digitization circuit
 6 shift register
 7 transfer shift register
 11 data read structure
 12 connection terminal
 13 send-out register
 14 intake circuit (load switch unit)
 15 bit register
 21 amplifier
 22 wave height discriminator
 31 bypass
 32 bypass selection circuit
 33 connection terminal
 35 terminal at the end
 36 terminal in the middle
 41 section half the section that is read in a predetermined arrangement
 42 section corresponding to the section 41 when rearranged
 51 data read structure
 100, 200, 400 radiation detector
 CU counter unit
 Dout output terminal
 Ipck circuit current
 Ld load signal
 Pck read clock
 Pcks read clock of individual counter unit CU
 Qin input terminal
 Qout output terminal
 Sck send-out clock
 Sft signal
 Sout output terminal
 SU shift unit

The invention claimed is:

1. A radiation detector having a plurality of single-photon-counting imaging cells, comprising:
 an imaging cell configured to generate a detection signal in accordance with the intensity of radiation;
 a digitization circuit configured to digitize the detection signal;
 a data read structure configured to count the digitized detection signal and to keep the result as a data bit; and
 a send-out register configured to limit the input of a predetermined data bit of data bits output from the data read structure by a data shift in accordance with a first clock, to keep the input data bit as a result of the limitation, and to send out the kept data bit by a data shift in accordance with a second clock.

2. The radiation detector according to claim 1, wherein a plurality of counter units configuring the data read structure switches the connection of internal shift register between data recording and readout by the control from outside.

3. The radiation detector according to claim 1, wherein the send-out register limits the output of a data bit on the lower digit side by the control of the input of the data bit.

4. The radiation detector according to claim 1, wherein the send-out register limits the output of a data bit on the higher digit side by the control of the input of the data bit.

5. The radiation detector according to claim 1, wherein the send-out register has a load switch unit configured to switch between enabling and disabling the output of a predetermined data bit output from the data read structure in accordance with a load signal received from outside.

6. The radiation detector according to claim 1, wherein the imaging cell has a photodiode which is applied with a reverse bias voltage and generates a current signal in response to incidence of radiation,
the digitization circuit has:
 an amplifier configured to amplify an input signal based on the current signal generated by the photodiode; and
 a wave height discriminator configured to discriminate output signals based on the amplified signal.

7. The radiation detector according to claim 1, wherein the send-out register has shift units in the same number as that of the data read structures and the output of the data read structure is connected to each shift unit.

8. The radiation detector according to claim 7, wherein the send-out register produces an output from both an end and a middle of the series of shift units.

9. The radiation detector according to claim 1, wherein a plurality of counter units configuring the data read structure has a shift register configured to keep the data bit and a transfer shift register configured to reflect the data bit kept in the shift register by the control from outside.

10. The radiation detector according to claim 9, wherein the shift register reflects data in the transfer shift register after rearranging the arrangement of each of the data bits in accordance with a pattern based on a table determined in advance.

11. The radiation detector according to claim 1, further comprising:
 a bypass configured to exclude a specific counter unit of the plurality of counter units the inputs and outputs of which are connected in series to each other and which configures the data read structure from the data read structure; and
 a bypass selection circuit configured to determine selection or unselection of the bypass.

* * * * *